(12) United States Patent
DeFranks et al.

(10) Patent No.: US 8,979,079 B2
(45) Date of Patent: Mar. 17, 2015

(54) SPRING COILS FOR INNERSPRING ASSEMBLIES AND METHODS OF MANUFACTURE

(75) Inventors: Michael S. DeFranks, Decatur, GA (US); David Brooks, Lawrenceville, GA (US); Michael Golin, Atlanta, GA (US); Rahul Kirtikar, Atlanta, GA (US)

(73) Assignee: Dreamwell, Ltd., Las Vegas, NV (US)

(*) Notice: Subject to any disclaimer, the term of this patent is extended or adjusted under 35 U.S.C. 154(b) by 156 days.

(21) Appl. No.: 13/292,492

(22) Filed: Nov. 9, 2011

(65) Prior Publication Data
US 2012/0112396 A1 May 10, 2012

Related U.S. Application Data

(60) Provisional application No. 61/411,797, filed on Nov. 9, 2010.

(51) Int. Cl.
*F16F 1/04* (2006.01)
(52) U.S. Cl.
CPC ...................................... *F16F 1/04* (2013.01)
USPC ...................................... 267/180; 267/166.1
(58) Field of Classification Search
USPC .............................. 267/91–92, 85, 180, 166.1
See application file for complete search history.

(56) References Cited

U.S. PATENT DOCUMENTS

| | | |
|---|---|---|
| 1,254,314 A | 1/1918 | D'Arcy |
| 2,257,994 A | 10/1941 | Zofnass |
| 2,461,062 A | 2/1949 | Kane |
| 2,480,158 A | 8/1949 | Owen |
| 3,751,025 A | 8/1973 | Beery et al. |
| 3,789,440 A | 2/1974 | Garceau |
| 4,111,407 A | 9/1978 | Stager |
| 4,120,489 A | 10/1978 | Borlinghaus |
| 4,244,089 A | 1/1981 | Cavaler |
| 4,424,695 A | 1/1984 | Kirchhoff et al. |
| 4,480,823 A | 11/1984 | Marcinczyk et al. |
| 4,529,848 A | 7/1985 | Cherry |
| 4,699,362 A | 10/1987 | Krakauer |
| 4,733,036 A | 3/1988 | Koizumi et al. |

(Continued)

FOREIGN PATENT DOCUMENTS

| | | |
|---|---|---|
| EP | 1527715 A1 | 5/2005 |
| EP | 1337357 B1 | 9/2006 |

(Continued)

OTHER PUBLICATIONS

Dreamwell Ltd., International Search Report for PCT Application No. PCT/2011/059948, mailed Feb. 8, 2012, 5 pp.

(Continued)

*Primary Examiner* — Anna Momper
(74) *Attorney, Agent, or Firm* — Cantor Colburn LLP

(57) ABSTRACT

A progressive spring coil comprises a first spring portion comprising a top end and a bottom end and having a first spring rate, wherein the first spring rate is substantially linear or substantially nonlinear; a second spring portion comprising a top end and a bottom end and having a second spring rate, wherein the second spring rate is substantially linear or substantially nonlinear; and a third spring portion disposed between the first spring portion and the second spring portion, wherein the third spring portion has a third spring rate, wherein the third spring rate is substantially linear or substantially nonlinear.

16 Claims, 9 Drawing Sheets

(56) References Cited

U.S. PATENT DOCUMENTS

| | | |
|---|---|---|
| 5,507,476 A | 4/1996 | Lin |
| 5,509,642 A | 4/1996 | Wells |
| 5,642,539 A | 7/1997 | Kuo |
| 5,699,998 A | 12/1997 | Zysman |
| 5,868,383 A | 2/1999 | Codos |
| 5,878,998 A | 3/1999 | Hsieh |
| 6,128,798 A | 10/2000 | Barman et al. |
| 6,193,225 B1 * | 2/2001 | Watanabe ............ 267/180 |
| 6,256,820 B1 | 7/2001 | Moser et al. |
| 6,523,812 B1 | 2/2003 | Spinks et al. |
| 6,533,259 B2 | 3/2003 | Devambe |
| 6,561,047 B1 | 5/2003 | Gladney et al. |
| 6,792,819 B2 | 9/2004 | Gladney et al. |
| 6,931,685 B2 | 8/2005 | Kuchel et al. |
| 6,944,899 B2 | 9/2005 | Gladney |
| 7,047,581 B2 | 5/2006 | Gladney |
| 7,168,117 B2 | 1/2007 | Gladney et al. |
| 7,178,187 B2 * | 2/2007 | Barman et al. ............ 5/716 |
| 7,677,541 B2 | 3/2010 | Ahn |
| 8,006,529 B2 | 8/2011 | DeFranks et al. |
| 8,337,368 B2 * | 12/2012 | Weller ............ 482/35 |
| 2004/0046297 A1 * | 3/2004 | DeMoss et al. ............ 267/142 |
| 2005/0056066 A1 | 3/2005 | DeFranks et al. |
| 2006/0042016 A1 | 3/2006 | Barman et al. |
| 2009/0106908 A1 * | 4/2009 | DeFranks et al. ............ 5/716 |
| 2009/0261518 A1 | 10/2009 | DeFranks et al. |

FOREIGN PATENT DOCUMENTS

| | | |
|---|---|---|
| FR | 2699245 A1 | 6/1994 |
| WO | 0013550 A2 | 3/2000 |
| WO | 03096847 A1 | 11/2003 |
| WO | WO2005028909 A1 | 3/2005 |
| WO | 2009058251 A2 | 5/2009 |

OTHER PUBLICATIONS

Dreamwell Ltd., Written Opinion for PCT Application No. PCT/2011/059948, mailed Feb. 8, 2012, 5 pp.

International Preliminary Report on Patentability issued in International PCT Application No. PCT/US2011/059648, dated May 23, 2013; 6 pages.

International Search Report dated Nov. 30, 2009 for PCT/US2008/012198 (WO2009058251A3).

He et al., "Nonlinear Theory of Conical Helical Spring", J. Harbin Engineering Univ., 26(5): pp. 628-362, (May 2005).

Rodriguez et al, "Exploiting Analytical Laws for a Constant-Pitch Conical Compression Spring", Springs [Springs Manufacture], SMI; 46(1): pp. 33-37, 2007.

[No Author], "Sleep Symphonie—Science Behind Sleep", Indo Shyam Industries, Pocket Spring—Mattresses and Sleep Systems, webpage, http://www.sleepsymphonie.com/sci_sleep.htm.

Non-Final Office Action dated Feb. 19, 2009 for U.S. Appl. No. 11/978,869.

Final Office Action dated Dec. 24, 2009 for U.S. Appl. No. 11/978,869.

Non-Final Office Action dated Aug. 3, 2010 for U.S. Appl. No. 11/978,869.

Final Office Action dated Jun. 16, 2011 for U.S. Appl. No. 11/978,869.

* cited by examiner

SPRING COILS FOR INNERSPRING ASSEMBLIES AND METHODS OF MANUFACTURE

CROSS-REFERENCE TO RELATED APPLICATION

This application claims the benefit of U.S. Provisional Application Ser. No. 61/411,797 filed Nov. 9, 2010, which is incorporated herein by reference in its entirety.

BACKGROUND

The present disclosure generally relates to spring coils for innerspring assemblies; and more particularly innerspring assemblies for cushioning articles, such as mattresses.

Traditional spring mattresses generally contain an innerspring assembly having a set of springs that provide cushioning support to one or more users. When a user sleeps on the surface of the mattress, he/she applies a weight on the underlying springs, which in turn compress to provide adequate cushioning support. Typically, lighter users apply less weight on the springs, causing these springs to compress less and thereby providing a different feel from what a heavier person would experience. Consequently, lighter users might experience a different level of comfort as compared to heavier users for a given set of springs. This can present a problem when two sleeping partners are of significantly different weights, for example 120 pounds and 220 pounds. In such cases, one mattress is unlikely to be comfortable for both partners.

One reason that a traditional mattress can be more comfortable to certain users is that they are often constructed with springs having linear spring rates. Such springs compress a distance that is linearly proportional to the weight of the user until they reach full compression. Therefore, traditional springs compress less under a lighter person than under a heavy person. Engineers have attempted to work around this problem by making mattresses having springs with non-linear spring rates (e.g., conical springs). Such non-linear springs can compress significantly under a light person and yet not fully compress under a heavy person, occasionally providing similar levels of comfort for both. However, depending on their exact properties, non-linear springs may only compress linearly unless a certain threshold weight is applied. Therefore, some non-linear springs would have to significantly compress prior to a user experiencing a desired level of comfort. In other words, users would need to be a sufficient weight before they can experience a certain level of comfort provided by the springs' non-linear compression. Besides requiring a heavy user, such significant compression of the innerspring assembly can also be unsuitable for the life of the bed.

Accordingly, it would be generally desirable to provide a cushioned article that provides a similar level of cushioning support for a wide range of users; and it would be particularly desirable for a mattress to be comfortable for users with a broad range of weights.

BRIEF SUMMARY

The system and methods described herein include progressive spring coils for innerspring assemblies in cushioned articles. In one embodiment, a progressive spring coil includes a first spring portion comprising a top end and a bottom end and having a first spring rate, wherein the first spring rate is substantially linear or substantially nonlinear; a second spring portion comprising a top end and a bottom end and having a second spring rate, wherein the second spring rate is substantially linear or substantially nonlinear; and a third spring portion disposed between the first spring portion and the second spring portion, wherein the third spring portion has a third spring rate, wherein the third spring rate is substantially linear or substantially nonlinear.

In another embodiment, an innerspring assembly for cushioning an article includes at least one asymmetric progressive spring coil configured to provide a three-phased load deflection response curve, wherein the progressive spring coils include: a first spring portion having a first substantially linear spring rate or a first substantially nonlinear spring rate; a second spring portion having a second substantially linear spring rate or a second substantially nonlinear spring rate; and a third spring portion disposed between the first spring portion and the second spring portion, wherein the third spring portion has a third substantially linear spring rate or a third substantially non-linear spring rate.

A method of manufacturing a cushioned article includes providing a plurality of asymmetric progressive spring coils, wherein each spring coil of the plurality comprises a first spring portion having a first substantially linear spring rate or a first substantially nonlinear spring rate; a second spring portion having a second substantially linear spring rate or a second substantially nonlinear spring rate; and a third spring portion disposed between the first spring portion and the second spring portion, wherein the third spring portion has a third substantially linear spring rate or a third substantially nonlinear spring rate, and wherein each progressive spring coil is configured to provide a three-phased load deflection response curve; connecting each progressive spring coil to an adjacent progressive spring coil to form one or more rows; arranging the one or more rows of the plurality of asymmetric progressive spring coils form an innerspring assembly; and disposing at least one additional layer in physical communication with the inner spring assembly.

The disclosure can be understood more readily by reference to the following detailed description of the various features of the disclosure and the examples included therein.

BRIEF DESCRIPTION OF THE DRAWINGS

Referring now to the figures wherein the like elements are numbered alike.

DETAILED DESCRIPTION

The systems and methods described herein include progressive spring coils for innerspring assemblies. The innerspring assemblies are configured to cushion articles, such as mattresses. The innerspring assemblies can have one or more asymmetrical progressive springs that are configured to provide a substantially similar level of firmness to users of different weights. The asymmetrical springs include portions having linear and non-linear spring rates. Generally, the progressive spring coil includes a first portion having a first spring rate, a second portion having a second spring rate, and a third portion disposed between the first and second portions having a third spring rate. In one embodiment, the progressive spring coil includes a first portion having a conical shape, a second portion below the first, also having a conical shape, and a third portion between the first and second portions having a substantially cylindrical or hyperbolic shape. In certain embodiments, the upper and lower conical portions are not symmetric. Such an arrangement allows a user of the mattress to experience non-linear compression without causing a substantial compression of the coil springs. The systems and methods provide for a mattress that is sufficiently soft for lighter users and sufficiently firm for heavier users.

For purposes of clarity, and not by way of limitation, it should be noted that the systems and methods can be described herein in the context of providing innerspring assemblies for mattresses. It will be appreciated, however, that the principles described herein can be adapted to a wide range of applications. For example, the principles of the present disclosure can be applied to couches where a cushion is affixed to a larger assembly. In addition, the principles can be applied to chairs, loveseats, sofas, daybeds, automotive seats, crib mattresses, fold-out couches, folding mattresses, ottomans, and the like. More generally, the systems described herein can be employed in any environment where it is desirable to provide support for a wide variety of users.

Figure 1:
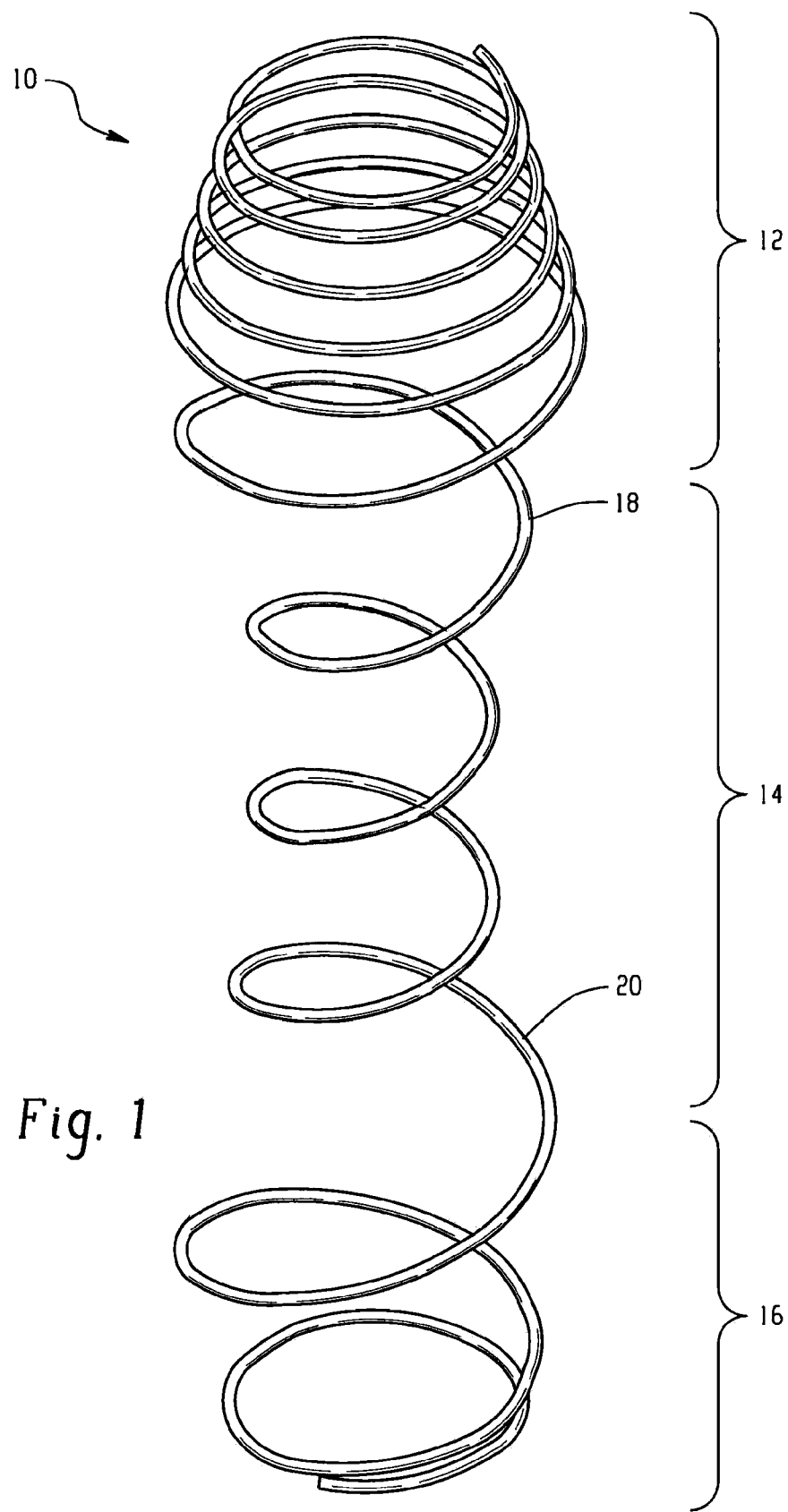
FIG. 1 illustrates a profile view of a progressive spring coil in accordance with an embodiment of the present disclosure.
Figure 2:
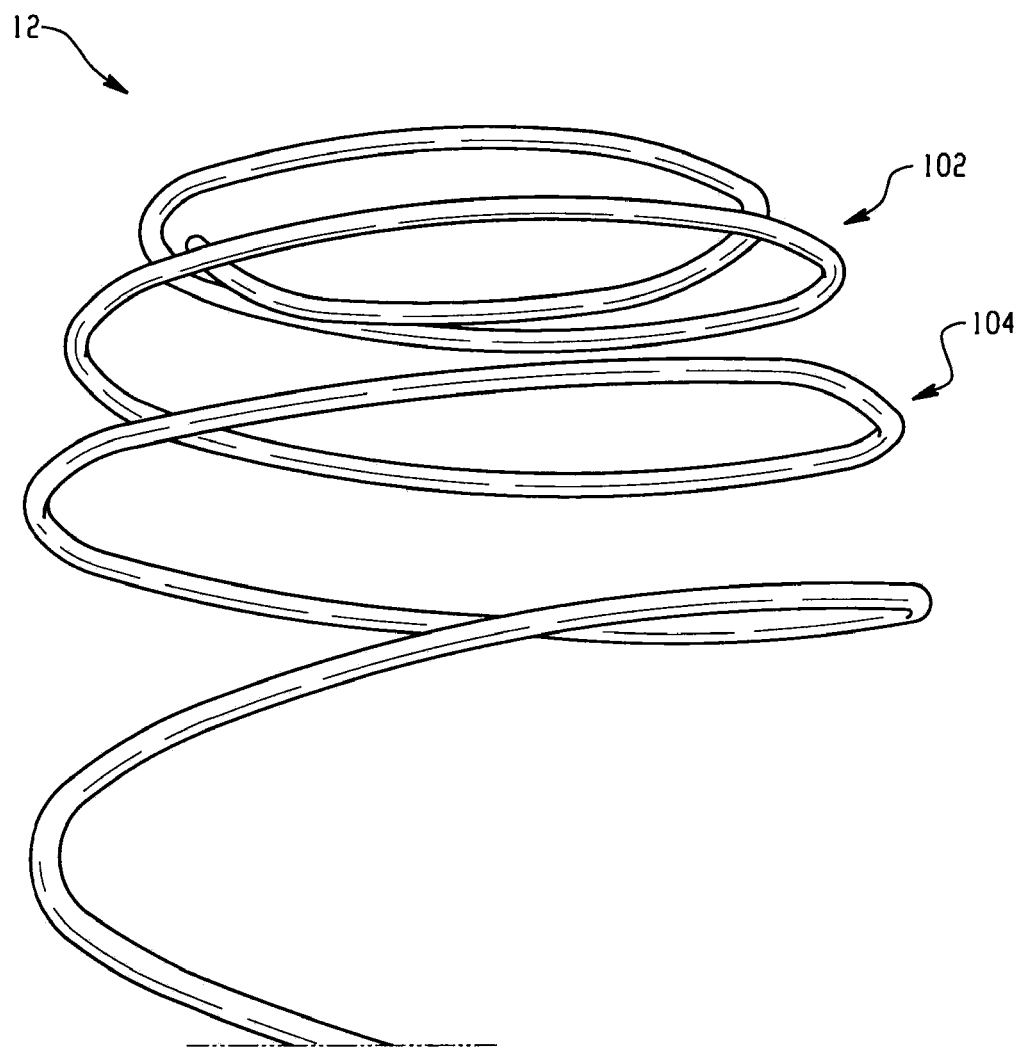
FIG. 2 illustrates a profile view of an upper spring portion of the progressive spring coil of FIG. 1, in accordance with an embodiment of the present disclosure.
Figure 3:
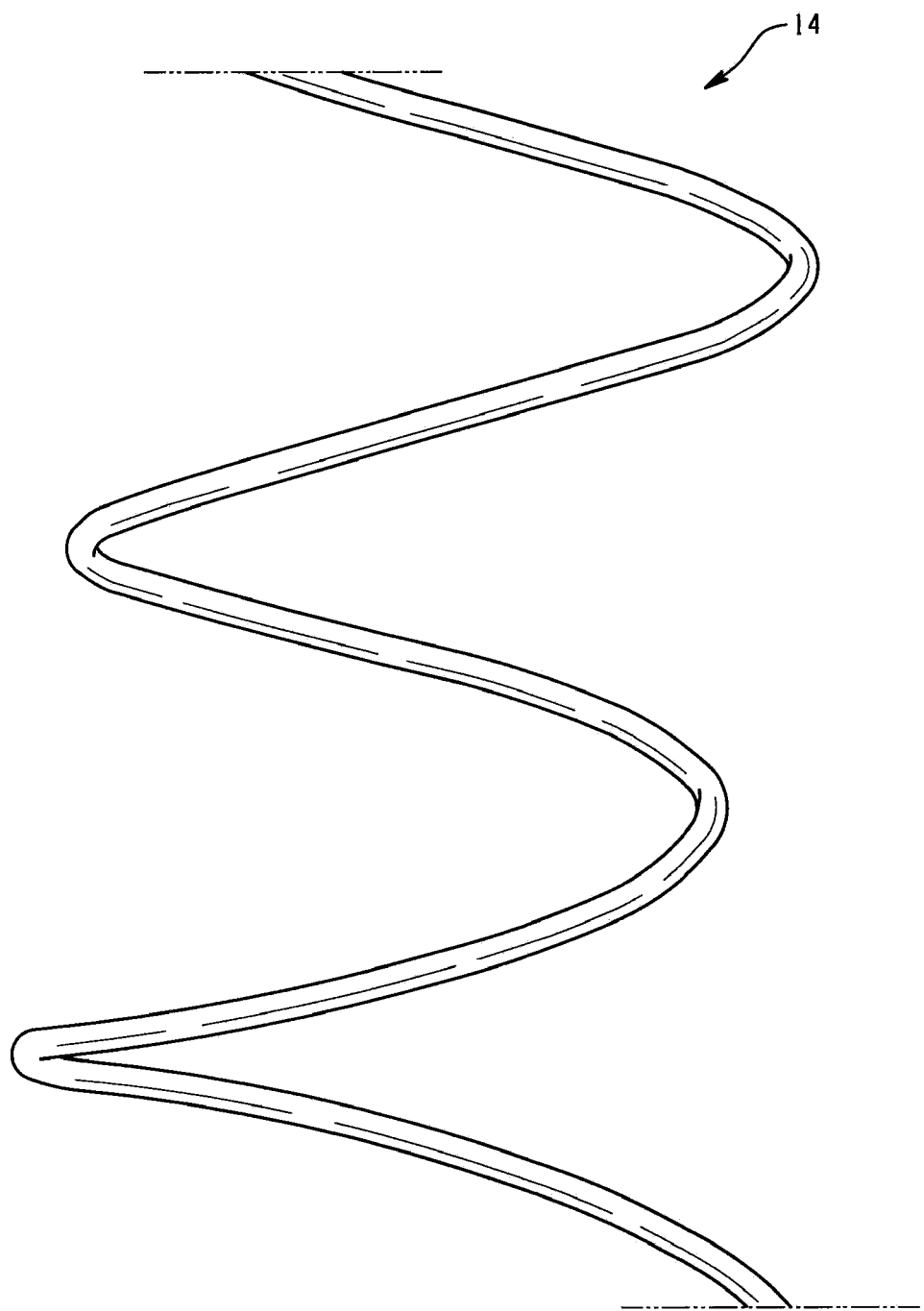
FIG. 3 illustrates a profile view of a middle spring portion of the progressive spring coil of FIG. 1, in accordance with an embodiment of the present disclosure.
Figure 4:
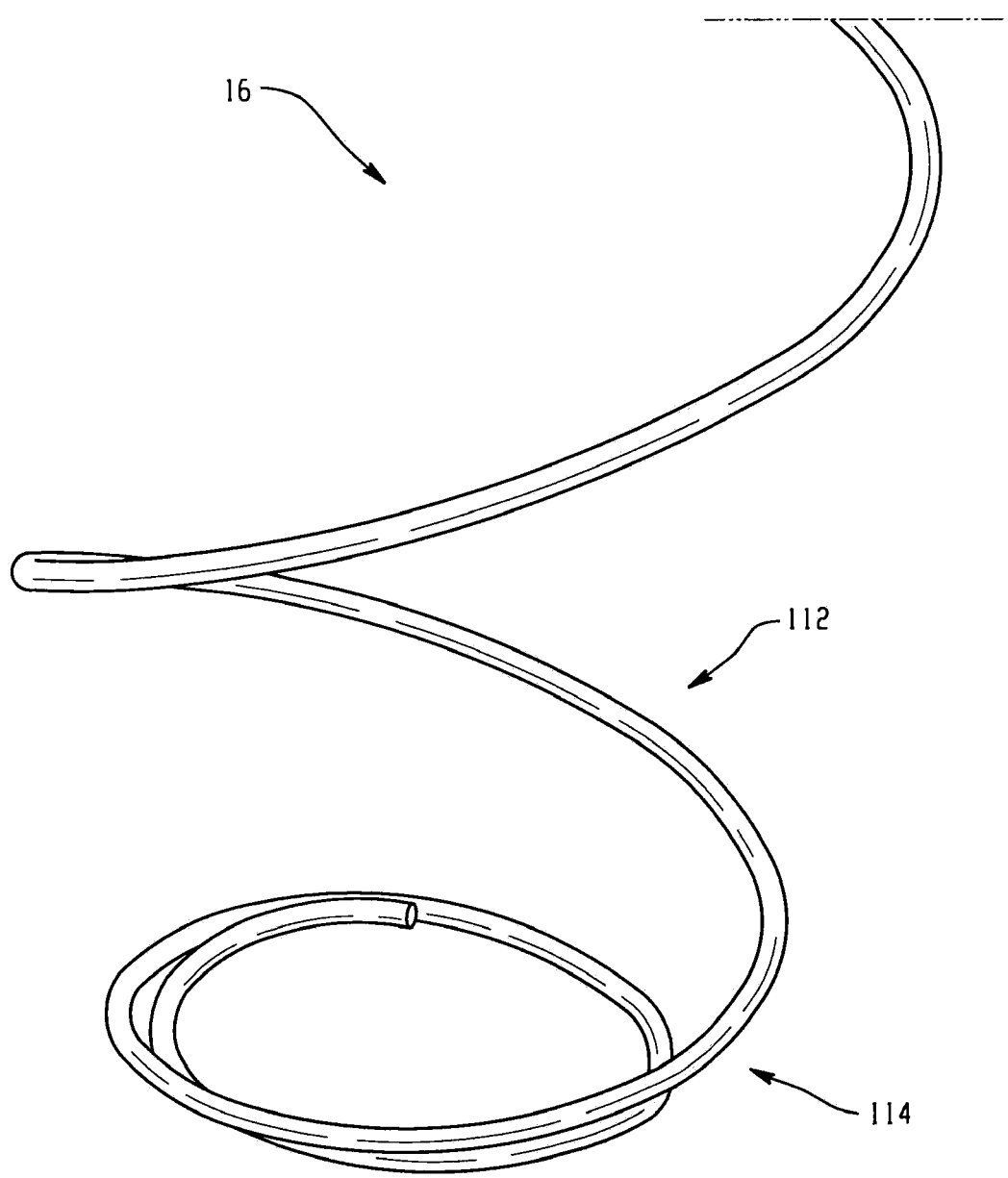
FIG. 4 illustrates a profile view of a lower spring portion of the progressive spring coil of FIG. 1, in accordance with an embodiment of the present disclosure.

Turning now to FIG. 1, an embodiment of an asymmetrical progressive spring 10 for use in an innerspring assembly is illustrated. The asymmetrical progressive spring 10 includes a first (e.g., upper) spring portion 12, a second (e.g., lower) spring portion 16 and a third (e.g., middle) spring portion 14. In this embodiment, the upper portion 12 and the lower portion 16 have a substantially conical shape, while the middle spring portion 14 has a substantially cylindrical shape. FIG. 2 is a magnified view of the upper spring portion 12 of the asymmetrical progressive spring coil 10. Similarly, FIG. 3 is a magnified view of the middle spring portion 14 and FIG. 4 is a magnified view of the lower spring portion 16. The specific asymmetric shape of the progressive spring coil 10 provides a three-phased load deflection response curve. Or, stated another way, the progressive spring coil 10 has two inflection points about portions having linear and non-linear spring rates, which enables the spring coil to provide a substantially similar level of firmness to users of different weights.

Figure 5:
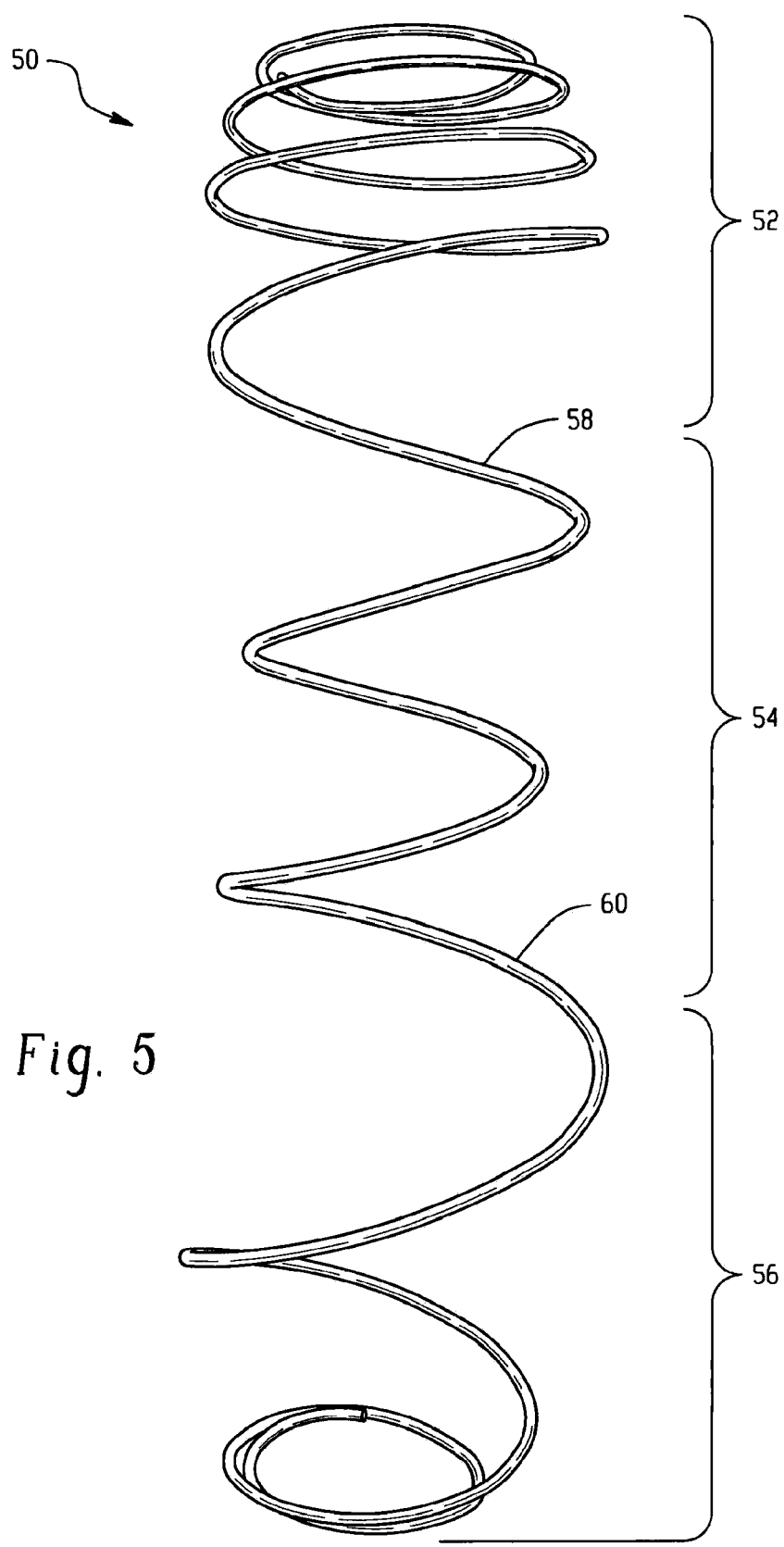
FIG. 5 illustrates a profile view of a progressive spring coil in accordance with an embodiment of the present disclosure.

In another embodiment the asymmetrical progressive spring can have a different shape, such as that illustrated in FIG. 5. The progressive spring 50 includes a first spring portion 52, a second spring portion 56 and a third spring portion 54 disposed between the first and second portions. In this embodiment, the first portion 52 and the second portion 56 also have a substantially conical shape, whereas the third portion 54 has a substantially hyperbolic shape (e.g., hourglass shape). While FIGS. 1-5 illustrate exemplary embodiments of the asymmetric progressive spring coil, it is to be understood that the spring can have any shape configured to provide a three-phased load deflection response curve. Or, stated another way, the progressive spring coils described herein include a shape and design having two inflection points about portions having linear or non-linear spring rates that enables the spring coil to provide a substantially similar level of firmness to users of different weights. Accomplishing such a function can be accomplished with more than one shape, as illustrated by FIGS. 1 and 5.

Returning now to FIG. 1, the upper spring portion 12 has a first substantially linear spring rate and a first substantially nonlinear spring rate. The lower spring portion 16 has a second substantially linear spring rate and a second substantially nonlinear spring rate. The middle spring portion 14 is disposed below the upper spring portion and above the lower spring portion and has a third substantially linear spring rate. In certain embodiments, the third substantially linear spring rate is greater than the first and second substantially linear spring rates. In other embodiments, the third substantially linear spring rate is greater than the first substantially linear spring rate but lower than the second substantially linear spring rate. The progressive spring 10 can be configured such that the upper portion substantially fully compresses before the lower two portions compress substantially. The upper spring portion 12 includes a plurality of convolutions having a first pitch between about 0.5 cm and about 1.5 cm or about 1.5% and 7.5% of the total spring height, the middle spring portion 14 includes a plurality of convolutions having a second pitch between about 3 cm and about 5 cm or about 10% and 25% of the total spring height, and the lower spring portion 16 includes a plurality of convolutions having a third pitch that can vary throughout the portion. The middle and lower portions can include convolutions of the same pitch. In certain embodiments, the first pitch is lower than the second pitch and third pitch. The second pitch can be less than, greater than, or equal to the third pitch. The pitch of a spring coil may affect its spring rate, and the spring coil can have pitches that confer linear and nonlinear spring rates on it.

In certain embodiments, the pitch of the convolutions in the upper spring portion 12 can be low enough that the portion flattens or bottoms out at some position after the progressive spring coil 10 is compressed to the desired coil pocket height in the innerspring assembly and before a predetermined height less than the pocket height. For example, in an innerspring assembly where the pocket height is 20 cm, the convolution pitch of the upper spring portion 12 can be configured such that the upper portion flattens (e.g. substantially full compression) after the progressive spring coil 10 is compressed to 20 cm and before the spring is further compressed to 15 cm (i.e., 5 cm less than the pocket height). The progressive spring coil 10 can generally include less pre-load in an innerspring assembly compared to current linear spring rate coils due to the low pitch convolutions of the substantially conical upper spring portion 12. These additional low-pitch active convolutions found in the upper portion of the progressive coil spring 10 are effective in providing more initial softness to the coil at the start of the compression cycle than current linear spring rate coils.

In certain embodiments, the upper spring portion 12 of the asymmetrical progressive spring coil 10 is substantially conical or substantially frustoconical. In certain embodiments, the lower spring portion 16 of the asymmetrical progressive spring coil 10 is substantially conical or substantially frustoconical. The middle spring portion 14 of the asymmetrical progressive spring coil 10 is substantially cylindrical, but can also be hyperbolic (hour-glass shaped), as illustrated in FIG. 5.

The middle spring portion 14 of the asymmetrical progressive spring coil 10 can include transition loops/convolutions between the lower and upper spring portions. The diameter of the substantially cylindrical convolutions of middle portion 14 can be less than the diameter of the lowest convolution of the upper portion 12 and less than the diameter of the highest loop/convolution of the lower portion 16, as illustrated in FIG. 1. One or more intermediate loops/convolutions in the middle portion 14 can form the transition 18 between the upper portion 12 and the substantially cylindrical convolutions of the middle portion 14. Similarly, one or more intermediate loops in the middle portion 14 can form the transition 20 between the lower portion 16 and the substantially cylindrical convolutions of the middle portion 14. Likewise, as can be seen in FIG. 5, the generally hyperbolic shape of the middle portion 54 results from the extended transition zones 58 and 60 separating the first portion 52 and the second portion 56 from the central substantially cylindrical convolution of the third portion 54. The diameter of the intermediate convolution in transition 58 is less than the diameter of the lowest convolution of the upper portion 52 and the diameter of the intermediate convolution in transition 60 is less than the diameter of the highest loop/convolution of the lower portion 56, but the intermediates have a large pitch creating an extended transition zone and giving an overall hyperbolic shape to the third portion 54.

The transition loops 18/20 or 58/60 can be symmetric or they can be asymmetric. The pitches of the transition loops can be the same or the upper transition loops 18/58 can be of higher or lower pitch than the lower transition loops 20/60. The upper transition 18/58 can have more or less loops than the lower transition 20/60. The upper transition loops 18/58 can also have larger or smaller diameter than the lower transition loops 20/60. In certain embodiments, the lower transition 20 has the highest pitch of all sections of the asymmetric progressive spring coil 10, and the upper transition 18 has the second-highest pitch. In one embodiment, each transition zone (18, 20, 58, 60) includes at least one full convolution of diameter greater than the diameters of the convolutions in the upper and lower spring portions, such that the spring coils are prevent from nesting during the assembly process.

The asymmetric progressive spring coils for the innerspring assemblies described herein can be formed of any material configured to compress and expand repeatedly in cushioning article. Exemplary materials for the spring coils can include, without limitation, those formed from metallurgical compositions containing one or more elements selected from the group consisting of steel, chromium, nickel, molybdenum, copper, titanium, cobalt, niobium, vanadium, aluminum, platinum, and tungsten. The progressive spring coil can be formed from a micro-alloy such as those described in U.S. Publication No. 2009/0261518, incorporated herein by reference in its entirety.

In one embodiment, the progressive spring coil 10 can be formed from a wire of equal diameter throughout the length of the spring coil. In this embodiment, the wire diameter can range from about 1 millimeter (mm) to about 2.5 mm (about 40 thousandths of an inch to about 1 tenth of an inch); specifically from about 1.5 mm to about 2.3 mm (60 thousandths of an inch to about 90 thousands of an inch). In one embodiment, the transition loops 18/20 have the same diameter as the upper, lower, and/or middle spring portions. In another embodiment, the transition loops 18/20 have a different diameter than those of the upper, lower and/or middle spring portions. In one embodiment, the transition zones of the progressive spring coil have diameters greater than the upper, lower and middle spring portions, such that the diameter of the intermediate convolutions define the minimum limits of the pocket diameter in a pocketed-coil innerspring assembly. The progressive spring coil can be formed from a multi-stranded wire cable such as those described in U.S. Pat. Nos. 7,047,581 and 7,168,117, incorporated herein by reference in their entirety. Methods for manufacturing spring coils from multi-stranded wire cable can be found in U.S. Pat. No. 8,006,529, also incorporated herein by reference in its entirety.

In one embodiment, the progressive spring coil 10 has a height from about 20 to about 30 centimeters (cm). The height of the upper spring portion 12 of the coil can range from about 2 cm to about 6 cm, or from about 5% to about 20% of the total progressive spring coil height. The middle spring portion 14 can range from about 10 cm to about 16 cm, or from about 40% to about 60% of the total progressive spring coil height. The lower spring portion 16 of the progressive spring coil can range from about 4 cm to about 10 cm, or from about 15% to about 35% of the progressive spring coil height.

Turning to FIG. 2, the upper spring portion 12 of the asymmetric progressive spring coil 10 includes a top end 102 and a bottom end 104. In one embodiment, the top end 102 of the upper portion has a diameter of about 3 cm to about 5 cm, and the bottom end 104 of the upper portion has a diameter of about 5 cm to about 7 cm. In certain embodiments, the diameter of the upper spring portion 12 of the spring coil monotonically increases from the top end 102 to the bottom end 104. In certain embodiments, the diameter of the bottom end 104 (the greatest width of the upper spring portion 12) is sufficiently small enough to remain, such that the upper spring portion 12 remains separated from adjacent spring coils disposed in the innerspring assembly when the progressive spring coil 10 is substantially fully compressed. Maintaining this separation between adjacent spring coils can be important to prevent unwanted interaction between coils (e.g., coil-on-coil clicking). Such a design of the upper spring portion 12 enables the portion to achieve a barrel shape after substantially full compression, thereby reducing the chances of contact with adjacent coils. In other embodiments, the diameter of the bottom end 104 is sufficiently large enough, such that when the upper portion 12 is substantially fully compressed (e.g., flattened) through compression of the progressive coil spring 10, the convolutions of the upper portion 12 are nested. Nesting of the convolutions in the upper spring portion 12 during substantially full compression is also helpful in preventing intra-coil interactions, such as the internal clicking.

As can be seen in FIG. 4, the lower spring portion 16 of the progressive spring coil 10 includes a top end 112 and a bottom end 114. In one embodiment, the top end 112 of the lower spring portion has a diameter of about 5 cm to about 8 cm, and the lower end 114 of the lower spring portion has a diameter of about 3 cm to about 5 cm. In certain embodiments, the diameter of the lower spring portion 16 of the progressive spring coil 10 monotonically increases from the bottom end 114 to the top end 112 of this portion.

In one embodiment, the diameter of the substantially cylindrical coils in the middle spring portion 14 is less than the diameter of the top end 102 of the upper spring portion 12. In another embodiment, the diameter of the top end 112 of the lower spring portion 16 is equal to the diameter of the bottom end 104 of the upper spring portion 12. In one embodiment, the substantially cylindrical coils of the middle spring portion 14 have a diameter from about 3 cm to about 6 cm.

The progressive spring coils described herein can be arranged in rows and columns to form innerspring assemblies such that each progressive spring coil is adjacent to at least one other spring coil. Adjacent progressive spring coils can be connected with adhesive. Alternatively, adjacent progressive spring coils can be connected with a hog ring or other metal fasteners. In other embodiments, adjacent progressive spring coils are not connected along the upper spring portion of the coils. In such embodiments, leaving the upper spring portion of the progressive spring coils disconnected allows one spring to compress without affecting adjacent springs. This practice can allow one sleeper to move on a mattress without disturbing the other sleeper. In certain embodiments, the spring coil can be an open coil or a coil encased in a fabric pocket. In other embodiments, the progressive spring coils described herein may be encased in fabric pockets and assembled in a VariForm® assembly, which by definition, alternates between rows of one type of encased spring coil type, with rows of another type of encased spring coil.

The innerspring assembly comprising a plurality of asymmetric progressive spring coils is adapted for a cushioned support structure, such as a mattress. The cushioned support structure can be a standard mattress size such as twin, twin XL, full, full XL, queen, Olympic queen, king, California king, and the like, or the cushioned support structure can have a custom size. In addition, the cushioned support structure could be a smaller mattress designed for a child or baby, such as those used in a crib or cradle.

The cushioned support structure can further include at least one additional layer disposed adjacent to the innerspring assembly. The at least one additional layer can include at least one of a padding layer, an upholstery layer, a frame layer, a quilted layer, a foam layer, a batting layer, a waterproof layer, and the like.

The invention is further illustrated by the following non-limiting Examples.

EXAMPLES

Progressive spring coils in accordance with the present invention were tested and compared against current spring coils having linear spring rates. Two asymmetric progressive spring coils were used, each having a different wire diameter. The first progressive spring coil, Example A, was an encased spring coil constrained to a pocket height of 20 cm. Example A had a wire diameter of 1.88 mm (0.074 inches). The second asymmetric progressive spring coil tested, Example B, was an encased coil constrained to the same 20 cm pocket height, but had a wire diameter of 2.11 mm (0.083 inches). Three current linear spring rate spring coils were used as comparative examples. The first current linear spring rate coil, Comparative Example 1, was constrained to a pocket height of 20 cm and had a wire diameter of 1.73 mm (0.068 inches). Similarly, the second current linear spring rate coil, Comparative Example 2, was also constrained to a pocket height of 20 cm and had a wire diameter of 1.88 mm (0.074 inches). Finally, a third current linear spring rate coil was used, Comparative Example 3, and was constrained to the 20 cm pocket height with a wire diameter of 2.11 mm (0.083 inches).

Load Deflection

Figure 6:
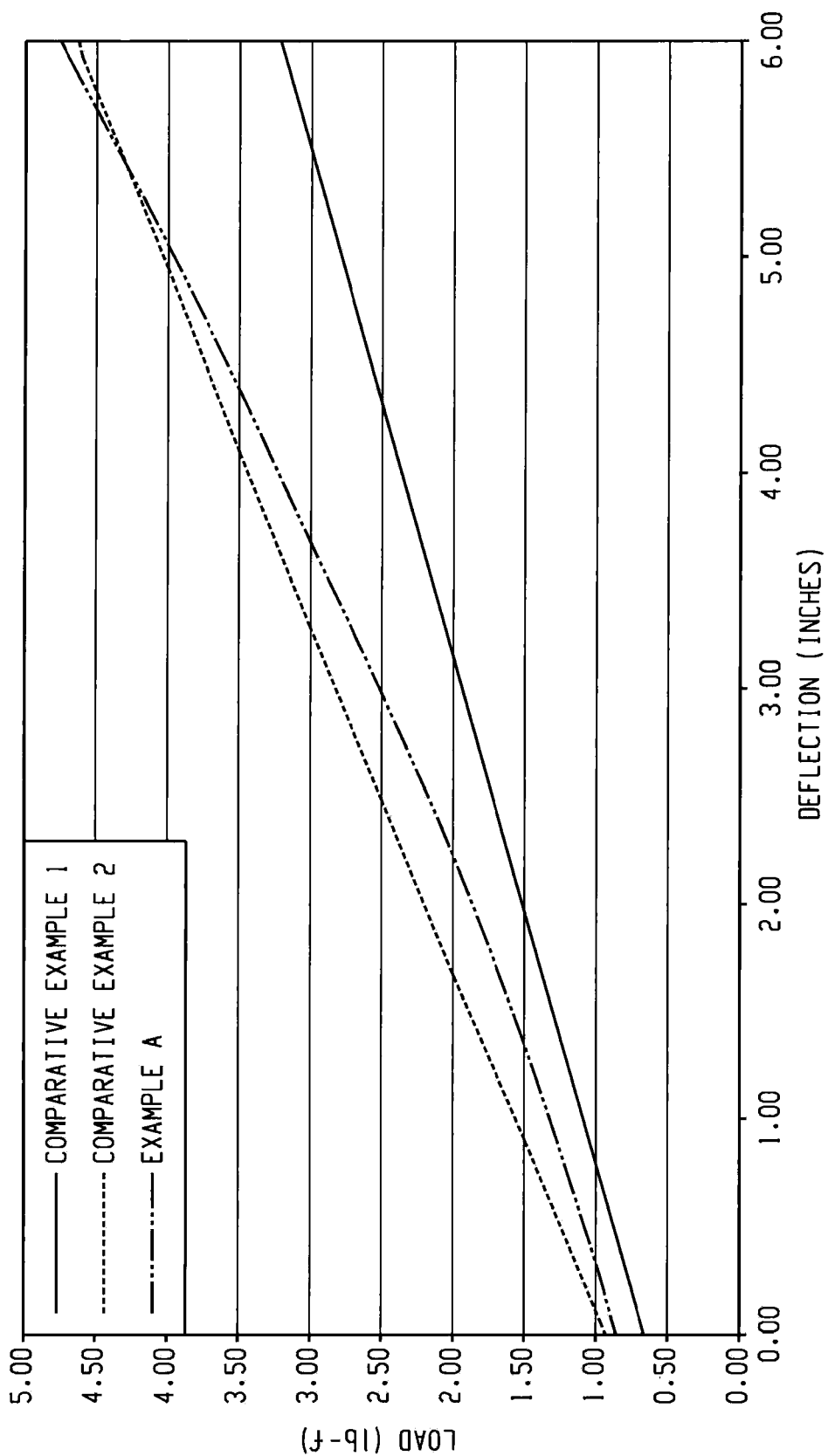
FIGS. 6 and 7 graphically illustrate the force deflection curves of progressive spring coils in accordance with an embodiment of the present disclosure and current linear spring rate spring coils.

For spring rate evaluation, each of the spring coils were placed between test platens that were set a distance of 20 cm (8.0 inches) apart. By utilizing the 20 cm (8.0 inch) pocket height as the platen separation, the initial load illustrated at the y-axis intercept of each spring coil curve accurately represented the pre-load applied to each pocket spring. The test platens then travel through an increasing deflection and the load response of the springs were measured. FIG. 6 graphically illustrates the load-deflection curves of Example A (the 1.88 mm (0.074 inch)) diameter progressive spring coil), Comparative Example 1 and Comparative Example 2. As seen in FIG. 6, the pre-load of Example A, 3.83 Newtons (0.86 pounds-force (lb-f) falls between the pre-loads of the current linear rate spring coils, Comparative Examples 1 (2.94 Newtons, 0.66 lb-f) and 2 (4.18 Newtons, 0.94 lb-f). Comparative Examples 1 and 2 produce substantially linear response curves throughout the load, as expected. The progressive spring coil of Example A, however, displays a unique response curve not seen in current linear and non-linear spring coils. This novel response to increasing load results in increased firmness throughout the deflection range of the spring coil.

Figure 7:
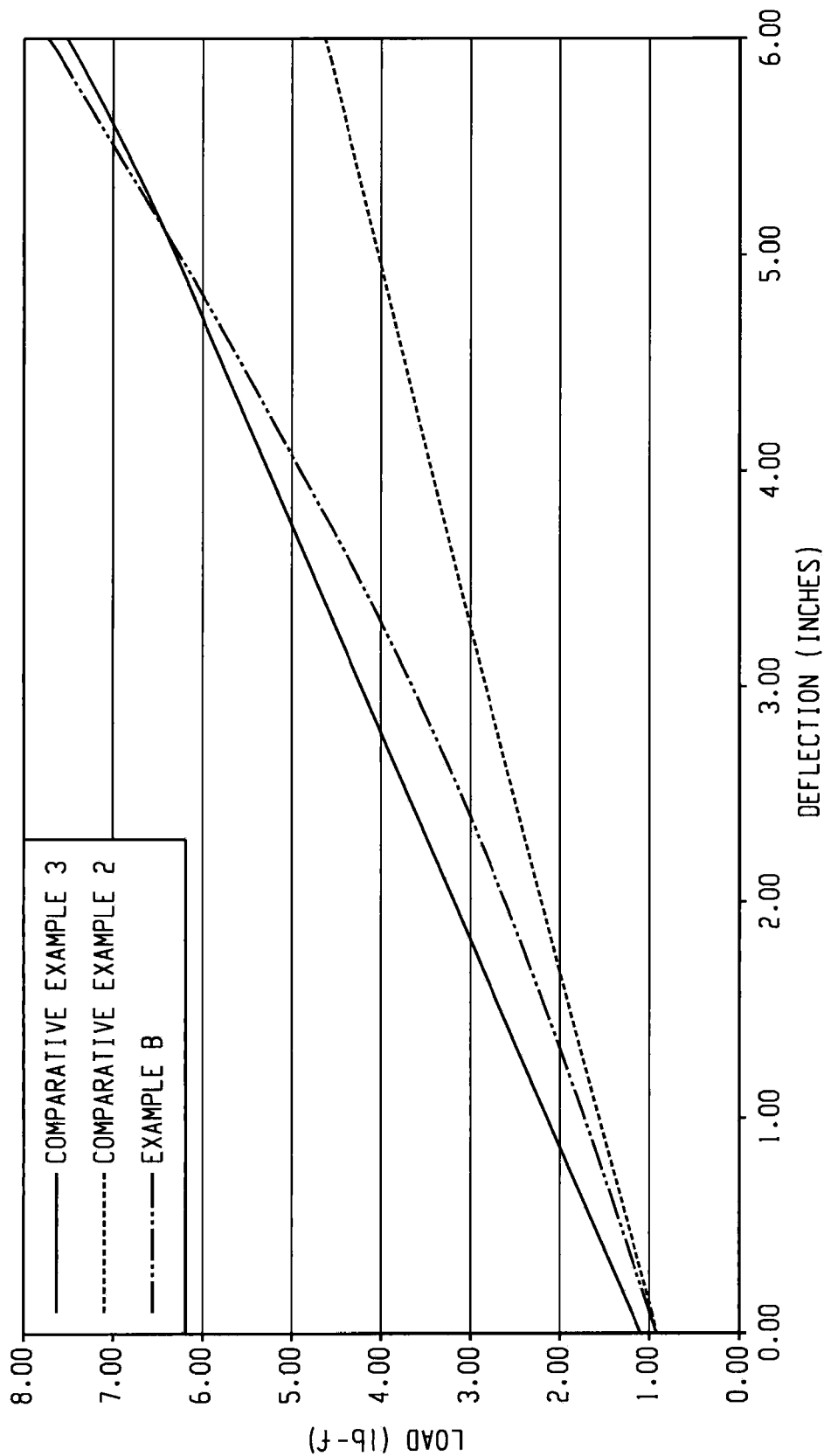

FIG. 7 graphically illustrates the load-deflection curves of Example B (the 2.11 mm diameter progressive spring coil), Comparative Example 2 and Comparative Example 3. As seen in FIG. 7, the pre-load of Example B, 3.96 Newtons (0.89 lb-f) is less than the pre-load of Comparative Example 2, 4.18 Newtons (0.94 lb-f) and Comparative Example 3, 4.94 Newtons (1.11. lb-f). The additional active convolutions in the upper spring portion that compress first at the start of the compression cycle, can provide more initial softness to the progressive coil compared to the current linear spring rate coils. Similar to FIG. 6, FIG. 7 illustrates the substantially linear response curves produced by Comparative Examples 2 and 3, and the uniquely three-phase response curve of Example B.

As can be seen in FIGS. 6 and 7, the progressive spring coils began with loads lower than the current linear spring rate spring coils of comparable wire diameter. However, the progressive firmness employed by the progressive spring coils resulted in loads that eventually overtook the current linear spring rate coils. In other words, the progressive spring coils had an initial response similar to a spring of thinner wire diameter, but consistently increased in firmness to provide more support than the current linear spring rate coils of the same wire diameter.

Durability

Figure 8:
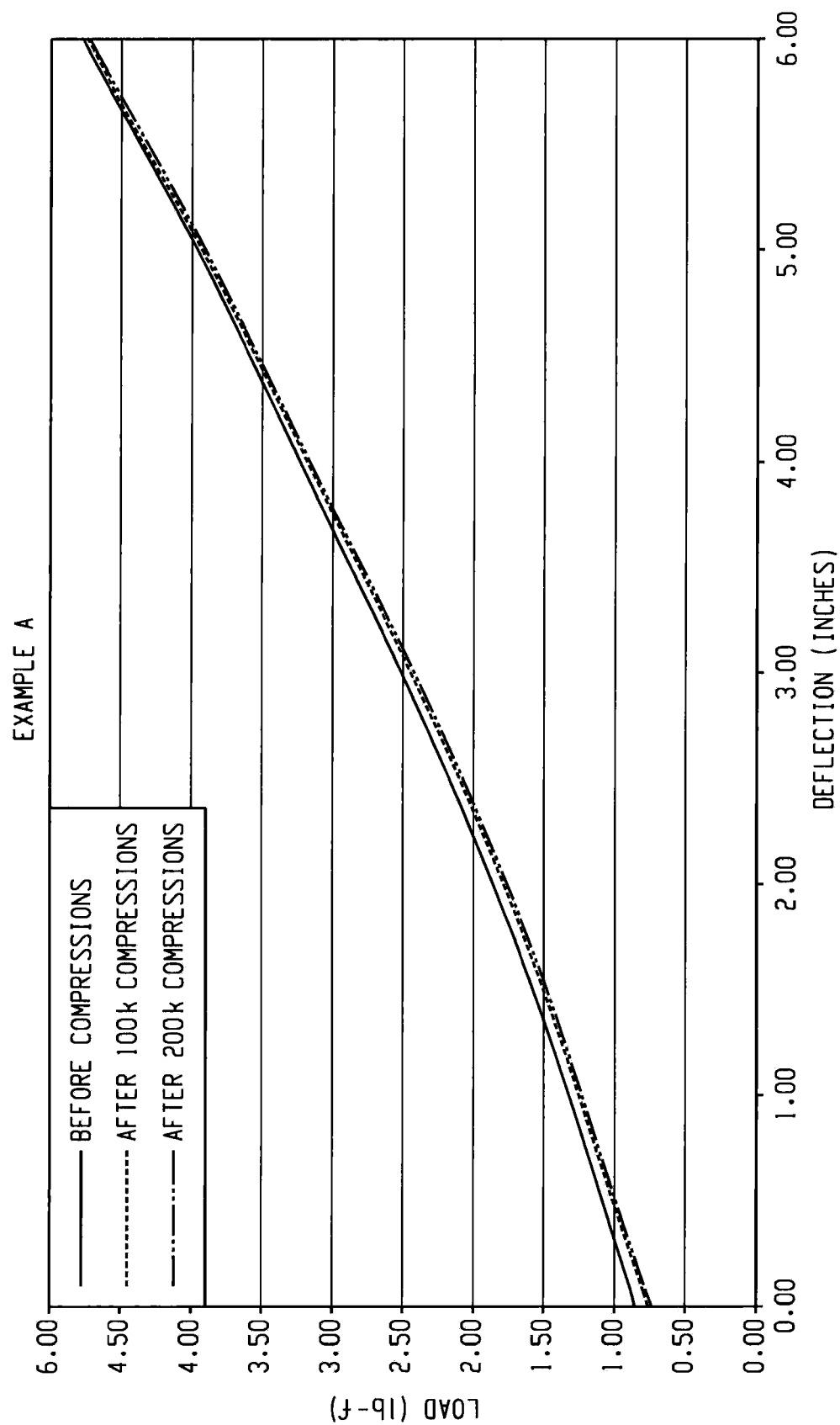
FIGS. 8 and 9 graphically illustrate the force deflection curves of progressive spring coils in accordance with an embodiment of the present disclosure after cyclical durability testing.
Figure 9:
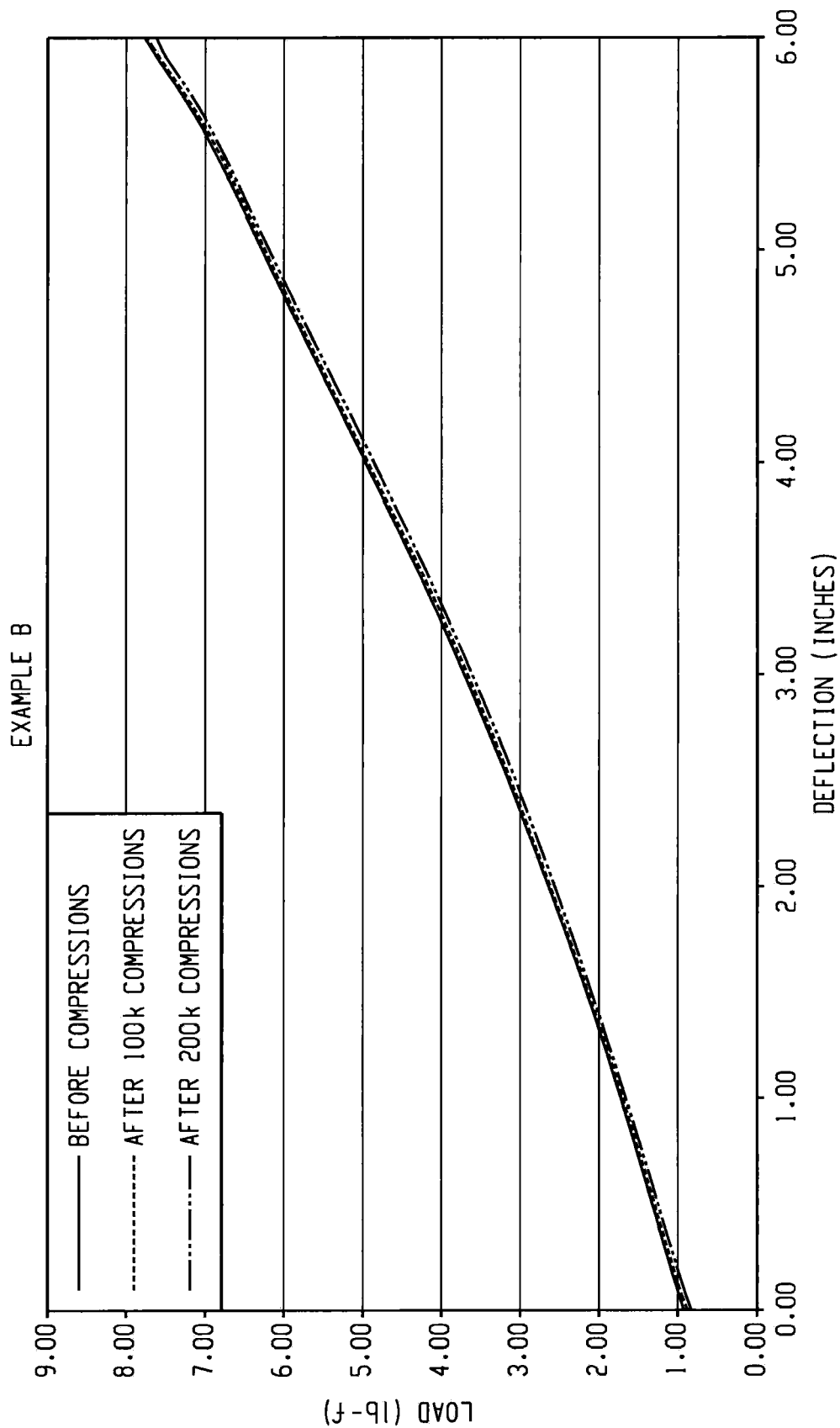

The progressive spring coils of Example A and Example B were also tested for their durability and compared to the 2.11 mm (0.083 inch) wire diameter current linear spring rate coil of Comparative Example 3. Each of the spring coils were subjected to repetitive cycling between their 20 cm pocket height and 10 cm of deflection. Load-deflection measurements were taken at incremental points during the cyclic testing. Plots of the load-deflection curves for Example A and Example B are shown in FIGS. 8 and 9, respectively. The curves show minimal changes to the springs after 100,000 and 200,000 cycles. At 200,000 cycles, Example A lost 2.36% of its initial spring height, while Example B lost 1.36%. By comparison, the current linear spring rate coil of Comparative Example 3 lost 1.17%. As such, the progressive spring coils described herein retain their response through 200,000 cycles of coil compression testing.

Motion Separation

Motion Separation Index (MSI) testing was conducted on mattresses placed on a rigid wood foundation to eliminate movement contributions by the foundation testing was conducted in accordance with the testing method disclosed in U.S. Pat. Nos. 6,792,819 and 6,561,047. Five mattresses were built for testing. Mattress 1 included alternating encased spring strands of progressive spring coils having 0.083 inch wire diameter and current spring coils having linear spring rates and 0.083 inch wire diameter. Mattress 2 included alternating encased spring strands of progressive spring coils having 1.88 mm (0.074 inch) wire diameter and current linear spring rate coils having 1.88 mm (0.074 inch) wire diameter. Mattress 3 included alternating encased spring strands of progressive spring coils having 1.88 mm (0.074 inch) wire diameter and current linear spring rate coils having 1.73 mm (0.068 inch) wire diameter. Each of the Mattresses 1-3 utilized a VariForm® construction of coils with a general maximum body diameter of 6.5 cm (2.58 inches) and a coil density of 856. Comparative Mattress A had a standard pocket spring construction of current linear spring rate coils having a wire diameter of 1.73 mm (0.068 inches) and a general maximum body diameter of 5.7 cm (2.25 inches) and a coil density of 991 with similar upholstery to Mattresses 1-3. Finally, Comparative Mattress B had a standard encased spring construction of current linear spring rate coils having a wire diameter of 1.73 mm (0.068 inches) and a coil density of 856 with different upholstery that is known to improve performance relative to the other specimens. For reference, coil densities are determined by the number of evenly distributed coils of the same body diameter that can reasonably fit in a standard 152 cm inch by 203 cm rectangular perimeter (i.e. a standard 60 inch by 80 inch Queen-sized mattress). The results of the MSI testing on each of the four mattresses are shown in Table 1 below:

TABLE 1

| Sample | Vertical (inch) | Horizontal (inch) | MSI |
|---|---|---|---|
| Mattress 1 | 0.0127 | 0.0227 | 571.8 |
| Mattress 2 | 0.0123 | 0.0210 | 606.1 |
| Mattress 3 | 0.0123 | 0.0230 | 572.1 |
| Comparative Mattress A | 0.0163 | 0.0523 | 294.3 |
| Comparative Mattress B | 0.0097 | 0.0427 | 386.1 |

The MSI testing showed superior motion separation for the VariForm® mattress constructions that included the progressive spring coils, i.e., Mattresses 1-3, when compared to the mattress comprised only of current linear spring rate coils having equal (856 coil density) or greater coil density (991 coil density).

This written description uses examples to disclose the invention, including the best mode, and also to enable any person skilled in the art to make and use the invention. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. The terms "first," "second," and the like, herein do not denote any order, quantity, or importance, but rather are used to distinguish one element from another. The terms "a" and "an" herein do not denote a limitation of quantity, but rather denote the presence of at least one of the referenced item.

What is claimed is:

1. A progressive spring coil, comprising:
 a first spring portion having a substantially conical shape defined by a plurality of convolutions having a first pitch, the first spring portion comprising a top end and a bottom end and having a first spring rate, wherein the first spring rate is substantially linear or substantially nonlinear, and wherein the top end has a diameter less than a diameter of the bottom end;
 a second spring portion having a substantially conical shape defined by a plurality of convolutions having a second pitch, the second spring portion comprising a top end and a bottom end and having a second spring rate, wherein the second spring rate is substantially linear or substantially nonlinear, and wherein the top end has a diameter larger than a diameter of the bottom end; and
 a third spring portion having a substantially cylindrical or a substantially hyperbolic shape disposed between the first spring portion and the second spring portion and defined by a plurality of convolutions having a third pitch, wherein the third spring portion has a third spring rate, and wherein the third spring rate is substantially linear or substantially nonlinear,
 wherein the first pitch of the first spring portion is less than the second pitch of the second spring portion and less than the third pitch of the third spring portion, and wherein the third spring portion further comprises a first transition loop disposed between the bottom end of the first spring portion and the third spring portion and a second transition loop disposed between the to end of the second spring portion and the third spring portion, wherein a pitch of the second transition loop is greater than the pitch of the first transition loop.

2. The progressive spring coil of claim 1, wherein the first spring portion is disposed above the second spring portion.

3. The progressive spring coil of claim 1, wherein the third spring portion is substantially cylindrical.

4. The progressive spring coil of claim 1, wherein the third spring portion is substantially hyperbolic.

5. The progressive spring coil of claim 1, wherein the third spring rate is greater than the first and the second spring rates.

6. The progressive spring coil of claim 1, wherein the second spring rate is greater than the first spring rate and is lower than the third spring rate.

7. The progressive spring coil of claim 1, wherein the first spring portion is configured to substantially fully compress before the third spring portion and the second spring portion substantially compress.

8. The progressive spring coil of claim 1, wherein the first pitch of the first spring portion is between about 0.5 centimeters and about 1.5 centimeters or about 1.5% and 7.5% of a total height of the spring coil.

9. The progressive spring coil of claim 8, wherein the third pitch of the third spring portion is between about 3 centimeters and about 5 centimeters or about 10% and 25% of the total spring coil height.

10. The progressive spring coil of claim 1, wherein a diameter of the first and the second transition loops is greater than a diameter of a plurality of substantially cylindrical convolutions of the third spring portion.

11. The progressive spring coil of claim 10, wherein the diameter of the plurality of substantially cylindrical convolutions of the third spring portion is less than a diameter of a lowest convolution of the bottom end of the first spring portion and less than a diameter of a highest convolution of the top end of the second spring portion.

12. The progressive spring coil of claim 1, wherein a pitch of the first transition loop is greater than the first pitch, the second pitch and the third pitch.

13. The progressive spring coil of claim 1, wherein the first spring portion, the second spring portion and the third spring portion are formed from a multi-stranded wire.

14. An innerspring assembly for cushioning an article, comprising:
 at least one asymmetric progressive spring coil configured to provide a three-phased load deflection response curve, wherein the progressive spring coils comprise:
 a first spring portion having a substantially conical shape defined by a plurality of convolutions having a first pitch and having a first substantially linear spring rate or a first substantially nonlinear spring rate;
 a second spring portion having a substantially conical shape defined by a plurality of convolutions having a second pitch and having a second substantially linear spring rate or a second substantially nonlinear spring rate; and a third spring portion having a substantially cylindrical or a substantially hyperbolic shape disposed between the first spring portion and the second spring portion, wherein the third spring portion is defined by a plurality of convolutions having a third pitch and has a third substantially linear spring rate or a third substantially non-linear spring rate, wherein the first pitch of the first spring portion is less than the second pitch of the second spring portion and less than the third pitch of the third spring portion, and wherein the third spring portion further comprises a first transition loop disposed between the bottom end of the first spring portion and the third spring portion and a second transition loop disposed between the top end of the second spring portion and the third spring portion, wherein a pitch of the second transition loop is greater than the pitch of the first transition loop.

15. The innerspring assembly of claim 14, wherein the first spring portion, the second spring portion and the third spring portion are formed form a multi-stranded wire having a uniform diameter.

16. A method of manufacturing a cushioned article, comprising providing a plurality of asymmetric progressive spring coils, wherein each spring coil of the plurality comprises a first spring portion having a substantially conical shape defined by a plurality of convolutions having a first pitch and having a first substantially linear spring rate or a first substantially nonlinear spring rate; a second spring portion having a substantially conical shape defined by a plurality of convolutions having a second pitch and having a second substantially linear spring rate or a second substantially nonlinear spring rate; and a third spring portion disposed between the first spring portion and the second spring portion, wherein the third spring portion having a substantially cylindrical or a substantially hyperbolic shape defined by a plurality of convolutions having a third pitch and has a third substantially linear spring rate or a third substantially nonlinear spring rate, wherein the first pitch of the first spring portion is less than the second pitch of the second spring portion and less than the third pitch of the third spring portion, and wherein each progressive spring coil is configured to provide a three-phased load deflection response curve, and wherein the third spring portion further comprises a first transition loop disposed between the bottom end of the first spring portion and the third spring portion and a second transition loop disposed between the top end of the second spring portion and the third spring portion, wherein a pitch of the second transition loop is greater than the pitch of the first transition loop;

connecting each progressive spring coil to an adjacent progressive spring coil to form one or more rows;

arranging the one or more rows of the plurality of asymmetric progressive spring coils form an innerspring assembly; and disposing at least one additional layer in physical communication with the inner spring assembly.

* * * * *